US012598413B2

(12) United States Patent
Von Mansberg

(10) Patent No.: US 12,598,413 B2
(45) Date of Patent: Apr. 7, 2026

(54) SPEAKER SYSTEM FOR AN IN-THE-EAR HEARING DEVICE

(71) Applicant: Sivantos Pte. Ltd., Singapore (SG)

(72) Inventor: Thilo Von Mansberg, Erlangen (DE)

(73) Assignee: Sivantos Pte. Ltd., Singapore (SG)

(*) Notice: Subject to any disclaimer, the term of this patent is extended or adjusted under 35 U.S.C. 154(b) by 127 days.

(21) Appl. No.: 18/610,558

(22) Filed: Mar. 20, 2024

(65) Prior Publication Data

US 2024/0323587 A1 Sep. 26, 2024

(30) Foreign Application Priority Data

Mar. 22, 2023 (DE) ..................... 10 2023 202 591.4

(51) Int. Cl.
*H04R 1/10* (2006.01)
*H04R 1/02* (2006.01)

(52) U.S. Cl.
CPC ........... *H04R 1/1091* (2013.01); *H04R 1/025* (2013.01); *H04R 1/1016* (2013.01); *H04R 2420/07* (2013.01)

(58) Field of Classification Search
CPC .... H04R 1/1091; H04R 1/025; H04R 1/1016; H04R 2420/07; H04R 25/604; H04R 2225/023; H04R 2225/025; H04R 2225/51; H04R 25/554; H04R 25/456
See application file for complete search history.

(56) References Cited

U.S. PATENT DOCUMENTS

| | | | | |
|---|---|---|---|---|
| 5,347,584 A * | 9/1994 | Narisawa | H04R 25/652 | 381/328 |
| 9,521,494 B2 * | 12/2016 | Nikles | H04R 25/554 | |
| 10,419,859 B2 * | 9/2019 | Singer | H04R 25/60 | |
| 10,542,359 B2 * | 1/2020 | Singer | H04R 25/60 | |
| 11,019,435 B2 * | 5/2021 | Flaig | H04R 25/456 | |
| 11,026,009 B2 * | 6/2021 | Ma | H04R 1/1058 | |
| 2002/0146141 A1 * | 10/2002 | Geschiere | H04R 25/604 | 381/361 |
| 2010/0111348 A1 * | 5/2010 | Tsao | H04R 1/1016 | 381/380 |
| 2014/0363037 A1 * | 12/2014 | Nikles | H04R 25/554 | 381/328 |
| 2015/0117687 A1 * | 4/2015 | Shcherbatko | H01Q 1/44 | 381/315 |

(Continued)

FOREIGN PATENT DOCUMENTS

| | | |
|---|---|---|
| DE | 102013210689 B3 | 10/2014 |
| DE | 102017215372 A1 | 3/2019 |

*Primary Examiner* — Oyesola C Ojo

(74) *Attorney, Agent, or Firm* — Laurence A. Greenberg; Werner H. Stemer; Ralph E. Locher

(57) ABSTRACT

A loudspeaker system for a hearing device to be worn in the ear has a loudspeaker with a housing, which has a sound exit opening that is arranged in a coupling surface of the housing. The loudspeaker system additionally has an antenna body, which has a carrier plate formed with a sound passage opening, a carrier sleeve rigidly connected to the carrier plate and fluidically connected to its sound passage opening, and an antenna coil wound around the carrier sleeve. Furthermore, the loudspeaker system has a damping body made of a yielding material, by way of which the loudspeaker is coupled using its coupling surface with the carrier plate of the antenna body.

11 Claims, 3 Drawing Sheets

(56) References Cited

U.S. PATENT DOCUMENTS

| | | | | |
|---|---|---|---|---|
| 2015/0146900 | A1* | 5/2015 | Vonlanthen | H04R 25/652<br>381/322 |
| 2015/0201290 | A1* | 7/2015 | Nikles | H04R 25/658<br>381/315 |
| 2017/0245066 | A1* | 8/2017 | Nikles | H04R 25/60 |
| 2018/0007478 | A1* | 1/2018 | Nikles | H04R 25/552 |
| 2019/0075407 | A1* | 3/2019 | Singer | H01Q 7/08 |
| 2020/0314563 | A1* | 10/2020 | Friis | H04R 25/456 |

* cited by examiner

SPEAKER SYSTEM FOR AN IN-THE-EAR HEARING DEVICE

FIELD AND BACKGROUND OF THE INVENTION

The invention relates to a loudspeaker system for a hearing device to be worn in the ear. In addition, the invention also relates to a hearing device.

Hearing devices are typically used to output a sound signal to the sense of hearing of the wearer of this hearing device. The output takes place by means of an output transducer, usually acoustically via airborne sound by means of a loudspeaker (also referred to as a "receiver"). Such hearing devices are often used here as so called hearing aid devices (also in short: hearing aids). For this purpose, the hearing devices normally comprise an acoustic input transducer (in particular a microphone), and a signal processor, which is configured to process the input signal (also: microphone signal) generated by the input transducer from the ambient sound with application of at least one signal processing algorithm, which is usually stored specifically for the user, such that a hearing loss of the wearer of the hearing device is at least partially compensated for. In particular in the case of a hearing a device, the output transducer can also be, in addition to a loudspeaker, alternatively a so-called bone vibrator or a cochlear implant, which are configured for mechanically or electrically coupling the sound signal into the sense of hearing of the wearer. The term hearing devices additionally also includes devices such as so-called tinnitus maskers, headsets, headphones, and the like.

Typical designs of hearing devices, in particular hearing aids, are behind-the-ear ("BTE") and in-the-ear ("ITE") hearing devices. These designations are directed to the intended wearing position. Behind-the-ear hearing devices thus have a (main) housing, which is worn behind the pinna. A distinction can be made here into models, the loudspeaker of which is arranged in this housing—the sound output to the ear typically takes place by means of a sound tube, which is worn in the auditory canal—and into models which have an external loudspeaker that is placed in the auditory canal. In-the-ear hearing devices, in contrast, have a housing which is worn in the pinna or even completely in the auditory canal.

In-the-ear hearing devices are known to require the smallest possible structural embodiment in order to also be able to arrange all required electrical components in the auditory canal or at least inside the pinna. However, some components, such as loudspeakers and/or microphones, also require a vibration-damped mounting, in order to avoid a (structure-borne) sound coupling from the loudspeaker to other components (in particular a microphone), but also to avoid mechanical damage to these components. However, such a mounting is usually associated with a comparatively large installation space requirement.

SUMMARY OF THE INVENTION

The invention is therefore based on the object of specifying an improved mount of a loudspeaker in a hearing device.

This object is achieved according to the invention by a loudspeaker system having the features as claimed. Furthermore, this object is achieved according to the invention by a hearing device having the features as claimed. Advantageous embodiments and refinements of the invention, which are in some cases inventive as such, are represented in the dependent claims in the following description.

The loudspeaker system according to the invention is configured and provided for use with, specifically in, a hearing device to be worn in the ear (such as an "ITE"). For this purpose, the loudspeaker system has a loudspeaker having a housing, which in turn has a sound exit opening arranged in a coupling surface of the housing. Furthermore, the loudspeaker system has an antenna body, which has a carrier plate having a sound passage opening, a carrier sleeve connected rigidly to the carrier plate and connected fluidically to the sound passage opening, and an antenna coil wound around the carrier sleeve. Furthermore, the loudspeaker system has a damping body made of a yielding material, by means of which the loudspeaker is coupled using its coupling surface with the carrier plate of the antenna body. The loudspeaker system thus comprises as the main components the loudspeaker and the antenna. The loudspeaker is coupled here by means of the damping body with the carrier plate for the antenna (or its carrier sleeve).

The hearing device to be worn in the ear according to the invention has a housing body and the loudspeaker system described in more detail here and hereinafter. The loudspeaker system is mounted by means of the antenna body in the housing body.

Hearing devices to be worn in the ear, in particular those for binaural use, often have an antenna in the form of a coil to be able to transmit data over a comparatively short radio link and in as directed a manner as possible. Since hearing devices to be worn in the ear often also have a very limited installation space, the most space-saving arrangement possible of all components is expedient. The above-described combination of loudspeaker and antenna coil has often proven itself, since the loudspeaker often has a sound exit nozzle (also referred to as a "spout"), by means of which the loudspeaker is coupled for sound conduction to a sound guide to the ear of the person using it. This sound outlet nozzle is usually omitted in the present embodiment. Its function is assumed here by the carrier sleeve, which moreover in particular also forms the ferrite core for the antenna coil.

According to the present invention, the antenna body is now coupled by means of the damping body with the loudspeaker. This is advantageous since the loudspeaker is usually mounted by means of the antenna body in the housing body of the hearing device in such an embodiment. The damping body therefore enables a vibration decoupling or at least damping of the loudspeaker from the housing body of the hearing device.

The hearing device has the same features and also advantages as the loudspeaker system.

The damping body is preferably made essentially plate-shaped, i.e., in particular flat and cuboid. In particular, the damping body thus has a plate or an essentially plate-shaped base structure. This plate can be made plane-parallel here, for example. A particularly simple structure thus results.

"Essentially plate-shaped" is to be understood here and hereinafter in particular to mean that in an optional variant the damping body can also be designed such that the loudspeaker plunges slightly, i.e., for example, up to at most 5 or 10% of its thickness, into the damping body. This predominantly has advantages during assembly. The loudspeaker can thus be aligned comparatively easily on the damping body (or vice versa) during adhesive bonding with the damping body.

In an alternative variant (in particular to the plane-parallel embodiment of the plate), the damping body, in particular its plate-shaped base structure, has a wedge shape. I.e., the plate has two opposing flat sides placed at an angle to one another, in particular a particularly flat angle of less than 15°, preferably of less than 10°. In this case, "flat sides" are to be understood as the two large-area flat lateral faces of the "plate" delimited by the edge faces extending approximately perpendicular thereto.

Furthermore, the damping body optionally has, in particular instead of the above-described depression in the damping body into which the loudspeaker plunges, additional elements for positioning the loudspeaker (in particular on the damping body). These elements are formed, for example, by at least one side wall, which protrudes at least approximately perpendicularly from the above-described plate.

The damping body optionally additionally also has fastening means, by means of which the loudspeaker can be fastened or else only supported in addition to the fastening by means of the antenna body in the housing body of the hearing device. For pure support, these fastening means can be formed, for example, by pin-like extensions, which support the loudspeaker system against and inside of the housing body. For fastening, these fastening means are expediently formed as a T-part. For example, this T-part is formed on the above-described side wall but can also protrude from the plate-shaped base structure of the damping body. During assembly of the loudspeaker system in the housing body, the T-part is inserted into a corresponding groove ("T-groove") formed in the housing body and thus offers fixing in the direction of the "bottom bar" of the T.

The loudspeaker and also the antenna body are expediently adhesively bonded to the damping body. Alternatively, however, they can also be welded to one another.

In order to be able to protect the loudspeaker as extensively as possible against damage when the hearing device falls to the ground, for example, in an advantageous embodiment, a material thickness and/or a shear modulus of the damping body (in particular its plate or plate-shaped base structure) is selected such that at a specified falling height, which in particular relates to a body size of the person using the hearing device, and a specified maximum acceleration for the loudspeaker, a sufficient braking path by the damping body is retained. This braking path is preferably dimensioned extending parallel to the coupling surface of the loudspeaker, i.e., in the plane of the planar extension of the damping body.

The material thickness or the shear modulus—in particular the required shear modulus value—is preferably additionally dimensioned as a function of a deceleration force and a connection area (in particular its size) of the damping body on the coupling surface and/or on the carrier plate, by means of the following formula, which in particular forms a first approximation or first design (for example, for a following simulated component design of the damping body building thereon):

$$G = \frac{F_S h}{s_d A_b} \tag{1}$$

wherein:

G the shear modulus, $F_S$ the deceleration force, h the material thickness, $s_d$ the deceleration path, and $A_b$ the connection area.

This leads to the deceleration force $$F_S = \frac{E_{pot}}{s_d} = \frac{mg_c H}{s_d} \tag{2}$$

with m the mass of the loudspeaker, $g_c$ the acceleration of gravity, which is assumed to be constant, and H the falling height.

The deceleration path is determined from $$s_d = \frac{H}{g_{zul}} \tag{3}$$

with $g_{zul}$ the maximum permissible acceleration for the loudspeaker.

In particular, the damping body meets the conditions introduced above as equations (1) to (3).

At an assumed maximum permissible acceleration (for the loudspeaker) of 8,000 times the acceleration of gravity (g) and a falling height of 1.65 m, a deceleration path of approximately 0.21 mm results, which has to be retained by the damping body. In particular, this can be produced by a yielding material (such as an elastomer) having a shear modulus of less than 3 $N/mm^2$. Such an elastomer (for example a rubber) can have, for example, a Shore hardness of 90. Due to the installation situation of the loudspeaker system, this deceleration path is required above all in the surface direction of the damping body. Deceleration paths in other spatial directions (for example, approximately perpendicular (plus/minus 10°) to the surface extension of the damping body) can usually be compensated or provided by the housing body of the hearing device (in particular in the insertion direction of the hearing device)—in particular in combination with the damping body, which is predominantly strained by tension and pressure in this case. The component design and design of the damping body are preferably carried out by means of a simulation—for example, a falling test and vibration simulation. Optionally, a simulation iteration is also used in this case. In particular, the above-described design on the basis of formulas (1) to (3) forms a starting point for the simulated design, in which a sufficient damping effect is optionally (iteratively) studied step-by-step.

The connection surface corresponds, for example, to the coupling surface of the loudspeaker or also a corresponding surface of the carrier plate of the antenna body.

In a further expedient embodiment, connection contacts of the loudspeaker are arranged in a connection surface of the housing differing from the coupling surface.

In a particularly expedient embodiment, the loudspeaker system is exclusively mechanically mounted by means of the antenna body on the housing body. Any possible force transmission via electrical wiring of the loudspeaker with an electronics unit is negligibly small here and preferably also formed such that in this way no intentional force dissipation takes place. For example, corresponding cables are laid sufficiently loose (also "slack" or not tensioned).

The conjunction "and/or" is to be understood here and hereinafter in particular such that the features linked by means of this conjunction can be formed both jointly and also as alternatives to one another.

BRIEF DESCRIPTION OF THE FIGURES

An exemplary embodiment of the invention is explained in more detail hereinafter on the basis of a drawing. In the figures.

DETAILED DESCRIPTION OF THE INVENTION

Parts corresponding to one another are always provided with identical reference signs in all figures.

Figure 1:
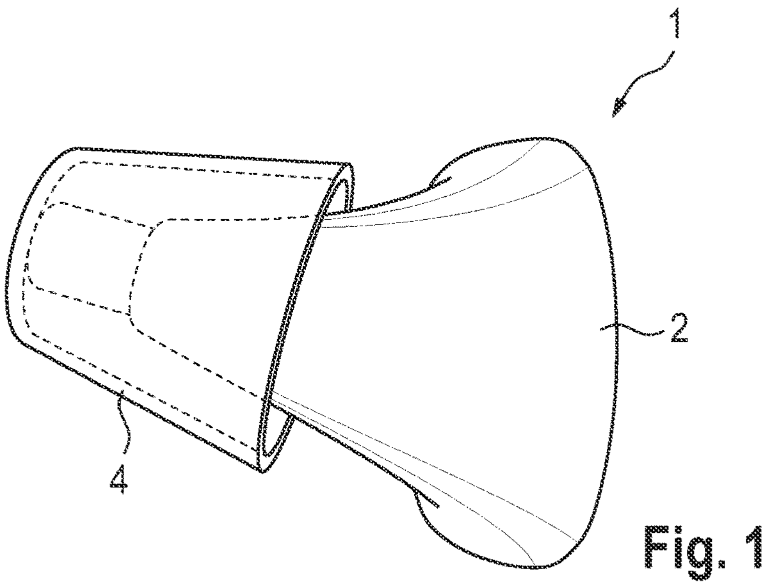
FIG. 1 shows a schematic side view of a hearing device to be worn in the ear, FIG. 2 schematically shows a perspective view of a loudspeaker system, FIGS. 3, 4 each schematically show, in a view according to FIG. 2, a damping body of the loudspeaker system from different sides.
Figure 2:
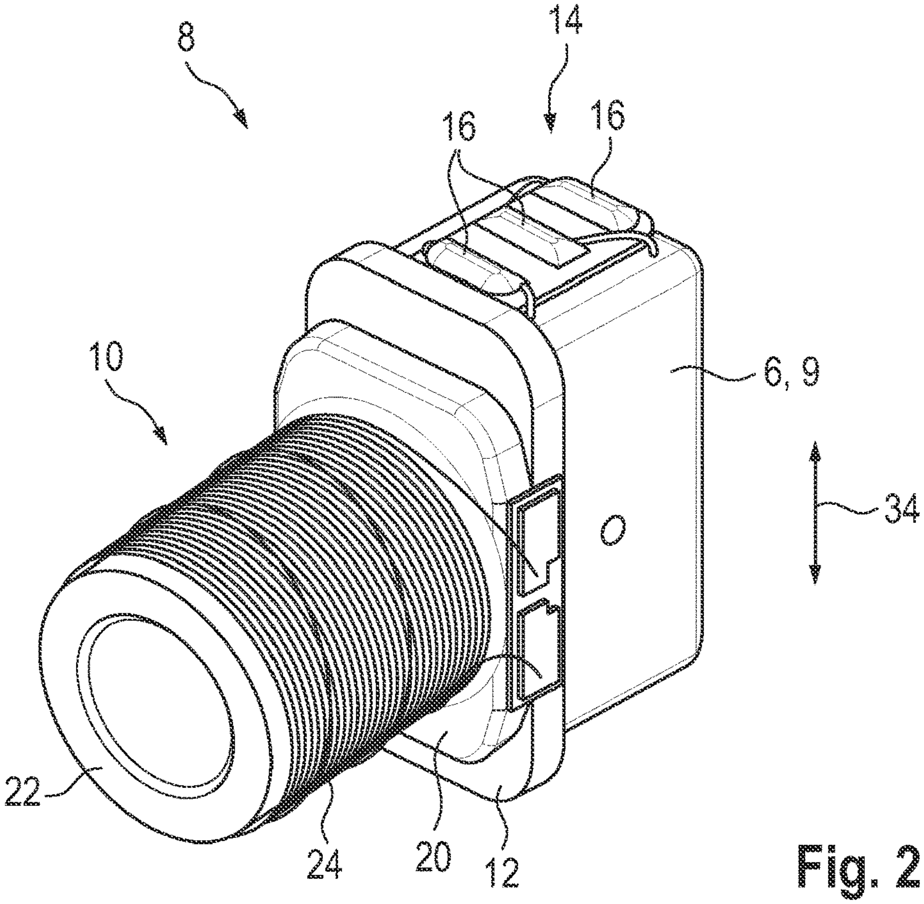

FIG. 1 schematically shows a hearing device to be worn in the ear, designated in short as ITE 1. The ITE 1 has a housing body 2, which is shaped so that it can be inserted into the auditory canal of a person using the ITE 1. To hold the ITE 1 in the auditory canal and also for the acoustic seal, the ITE 1 has an earpiece 4 made of an elastomer. Electronic components of the ITE 1 are arranged inside the housing body 2 (see also FIG. 5). These include a loudspeaker 6, which in the present embodiment is part of a loudspeaker system 8 (FIG. 2).

The loudspeaker system 8 has the loudspeaker 6, which is formed having a cuboid housing 9. Furthermore, the loudspeaker system 8 has an antenna body and a damping body 12, which is arranged between the loudspeaker 6 and the antenna body 10.

The loudspeaker 6 has a sound exit opening on a lateral face (not shown in detail), designated as a coupling surface, with which the loudspeaker 6 presses against the damping body 12. The loudspeaker 6 bears multiple connection contacts 16 on a lateral or end face 14 perpendicular thereto (also: "connection surface").

Figure 3:
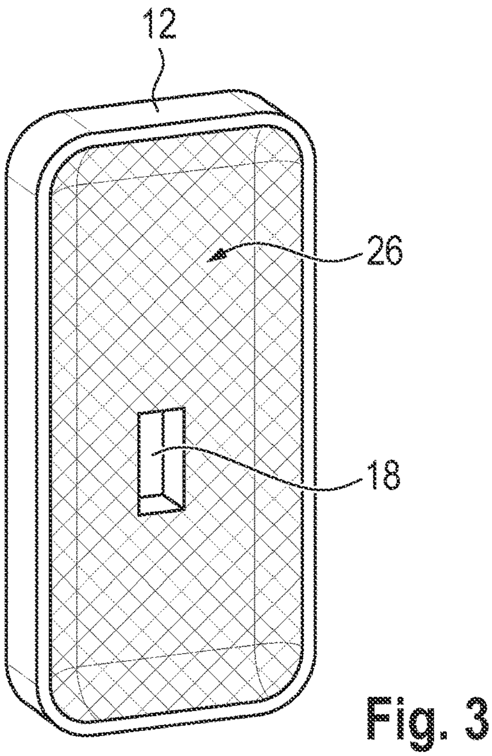
Figure 4:
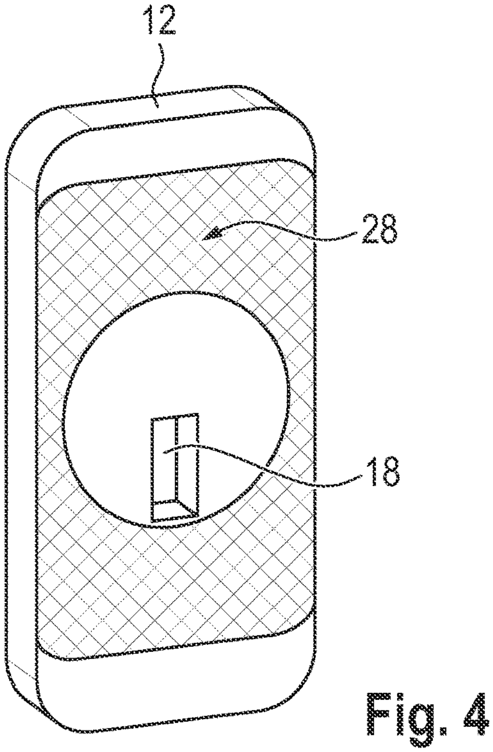

The damping body 12 is formed in the present exemplary embodiment as a flat plate, which spans the coupling surface of the loudspeaker 6. In addition, the damping body 12 is formed slightly concave (see FIG. 3), so that the loudspeaker 6 is countersunk in the damping body 12, but only by less than 5% of the height of the end face 14. The damping body 12 additionally has a sound opening 18, which in the intended assembly state is brought into overlap with the sound exit opening of the loudspeaker 6.

The antenna body 10 has a carrier plate 20 and a carrier sleeve 22 standing on this carrier plate 20. The carrier plate 20 has a sound passage opening (not shown), which in the intended assembly state has a fluidic connection to the sound exit opening of the loudspeaker 6 and thus also to the sound opening 18. The carrier sleeve 22 is formed hollow. Carrier sleeve 22 and carrier plate 20 are formed from ferrite. The antenna body 10 additionally has an antenna coil 24, the coil wire of which is wound around the carrier sleeve 22.

The loudspeaker 6 is adhesively bonded using the damping body 12 on a first adhesive surface 26 and this is adhesively bonded via a second adhesive surface 28 to the carrier plate 20. The damping body 12 is designed as a function of a maximum permissible acceleration for the loudspeaker 6. For this purpose, a shear modulus for the material of the damping body 12 is determined on the basis of formulas (1) to (3) introduced above on the basis of a falling height to be expected, a thickness of the damping body 12, a surface on which the damping body 12 is fixed ("attachment surface", for example, the adhesive surface 28 to the carrier plate 20 or the adhesive surface 26 to the loudspeaker 6), a deceleration force, and a deceleration path. This shear modulus is preferably less than 3 $N/mm^2$.

Figure 5:
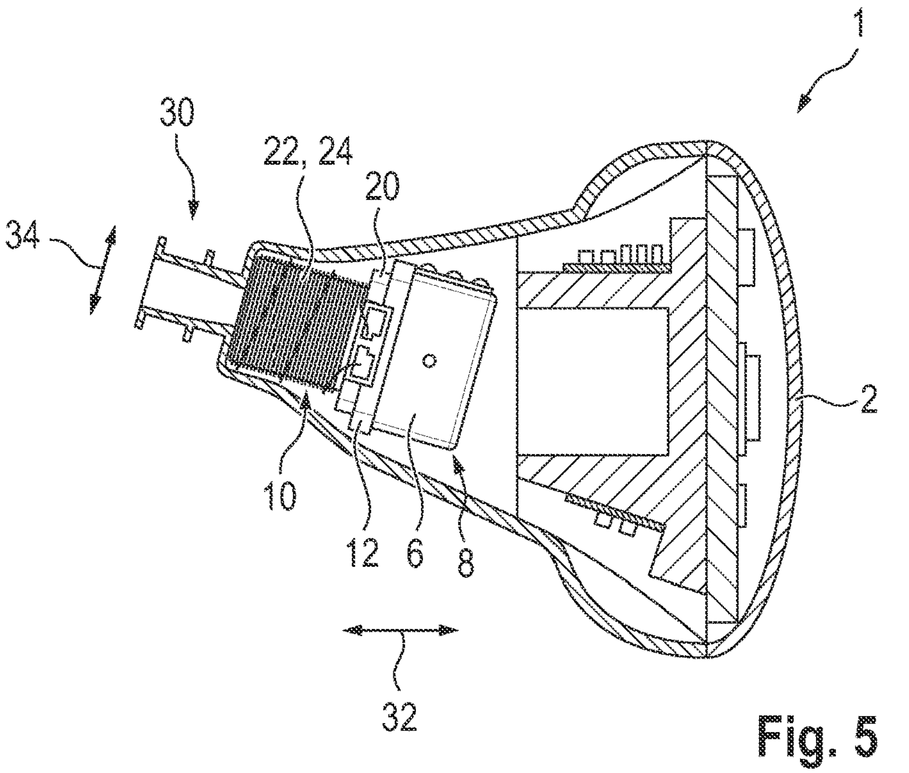
FIG. 5 shows the hearing device in a partially transparent representation in a view according to FIG. 1, and FIG. 6 schematically shows a perspective view of a further exemplary embodiment of the loudspeaker system.

As can be seen in FIG. 5, the loudspeaker system 8 is arranged having the carrier sleeve 22 in front in the housing body 2 in an end 30 intended to face toward the eardrum and is fixed by means of the carrier sleeve 22. The loudspeaker 6 is therefore only mounted and fixed by means of the damping body 12 in relation to the housing body 2. In the event of a fall of the ITO 1, impacts in the longitudinal direction 32 can already be partially compensated for by the housing body 2. In the "transverse direction" 34, i.e., in the surface direction of the damping body 12, its design described above comes to bear, so that such "lateral accelerations" can be absorbed by the damping body 12. However, "longitudinal accelerations" can also be absorbed at least to a certain degree or proportionally by tension and pressure deformations of the damping body 12 in the thickness direction. An additional mount for the loudspeaker 6 is not required.

Figure 6:
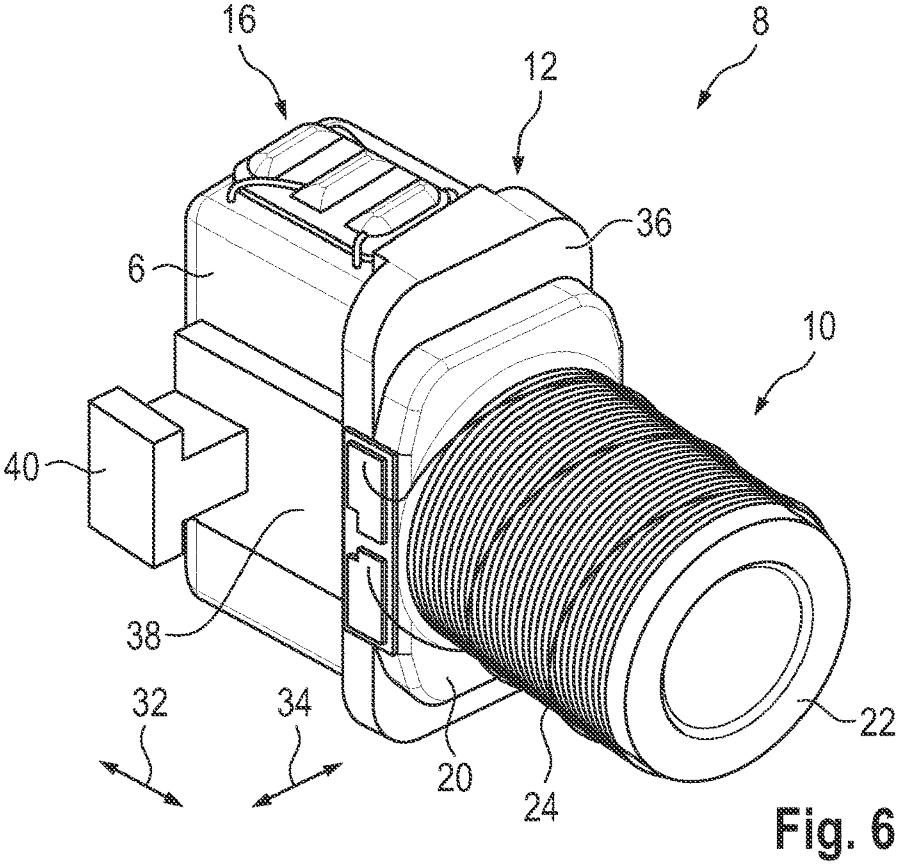

FIG. 6 shows a further exemplary embodiment of the loudspeaker system 8, specifically the damping body 12. The damping body 12 is formed in this case by a wedge-shaped plate 36, in which the above-described depression is not formed. The wedge shape of the plate 36 enables a specific falling direction to be damped more strongly. This design is determined by simulative design, which originates from a starting point determined by means of formulas (1) to (3). The direction of the wedge can therefore also be oriented differently, for example, in the illustration of FIG. 6 from top (thus from the edge facing toward the connection contacts 16, having thinner wall thickness there) to bottom (thicker wall thickness there).

In addition to this plate 36, the damping body 12 also has a side wall 38, which is aligned perpendicular to the plate 36 and presses laterally against the loudspeaker 6. This plate 36 offers additional damping.

In addition, the damping body 12 has fastening means for additionally fixing the loudspeaker 6 in the housing body 2. These are formed in the form of a T-part 40, which is formed on the side wall 38. The T-part 40 is specifically used to be inserted into a corresponding groove (not shown) formed in the housing body 2. The T-part 40 is formed from the same material as the plate 36 (and this as the damping body 12 from the preceding exemplary embodiment) and also the side wall 38. Additional stabilization and thus also vibration damping therefore results for the loudspeaker. Optionally, the side wall 38 and/or the T-part 40 can also be omitted, however, if the fastening body 12 is embodied having the wedge-shaped plate 36.

The subject matter of the invention is not restricted to the above-described exemplary embodiment. Rather, further embodiments of the invention can be derived by a person skilled in the art from the above description.

LIST OF REFERENCE SIGNS

1 ITE
2 housing body
4 earpiece
6 loudspeaker
8 loudspeaker system

9 housing
10 antenna body
12 damping body
14 end face
16 connection contacts
18 sound opening
20 carrier plate
22 carrier sleeve
24 antenna coil
26 adhesive surface
28 adhesive surface
30 end
32 longitudinal direction
34 transverse direction
36 plate
38 side wall
40 T-part

The invention claimed is:

1. A loudspeaker system for a hearing device to be worn in an ear, comprising:

a loudspeaker having a housing with a coupling surface and a sound exit opening formed in said coupling surface of said housing;

an antenna body having a carrier plate formed with a sound passage opening, a carrier sleeve rigidly connected to said carrier plate and fluidically connected to said sound passage opening, and an antenna coil wound around said carrier sleeve; and a damping body made of a yielding material, said damping body connecting said loudspeaker by way of said coupling surface of said housing with said carrier plate of said antenna body; and wherein at least one of a material thickness or a shear modulus of said damping body is selected such that, with reference to a specified falling height, which relates to a height of a person wearing the hearing device, and a specified maximum acceleration for the loudspeaker, said damping body provides for a sufficient braking path.

2. The loudspeaker system according to claim 1, wherein said damping body is substantially plate-shaped.

3. The loudspeaker system according to claim 2, wherein said damping body is configured to enable said loudspeaker to plunge slightly into said damping body.

4. The loudspeaker system according to claim 1, wherein said damping body has a wedge shape.

5. The loudspeaker system according to claim 2, wherein said damping body is formed with protruding elements for positioning said loudspeaker.

6. The loudspeaker system according to claim 5, wherein said protruding elements are formed by a side wall of said damping body.

7. The loudspeaker system according to claim 1, wherein said damping body has additional fastening means for mounting said loudspeaker in a housing body of the hearing device.

8. The loudspeaker system according to claim 1, wherein the braking path is defined parallel to said coupling surface.

9. The loudspeaker system according to claim 1, wherein the at least one of the material thickness or the shear modulus is moreover dimensioned as a function of a deceleration force and an attachment surface of said damping body on one or both of said coupling surface and said carrier plate, based on the formula $$G = \frac{F_S h}{s_d A_b}$$

where:

G is the shear modulus;

h is the material thickness;

$F_s$ is the deceleration force;

$S_d$ is the braking path; and $A_b$ is the attachment surface.

10. The loudspeaker system according to claim 1, which comprises connection contacts of said loudspeaker arranged in a connection surface of said housing that differs from said coupling surface.

11. A hearing device to be worn in an ear, the hearing device comprising:

a housing body;

a loudspeaker system according to claim 1 mounted in said housing body by way of the antenna body.

* * * * *